(12) United States Patent
Sun et al.

(10) Patent No.: US 12,149,474 B2
(45) Date of Patent: Nov. 19, 2024

(54) SOLUTIONS FOR ENHANCEMENT OF INTER-CELL OPERATION FOR MULTI-TRP

(71) Applicant: APPLE INC., Cupertino, CA (US)

(72) Inventors: Haitong Sun, Cupertino, CA (US); Chunhai Yao, Beijing (CN); Dawei Zhang, Cupertino, CA (US); Hong He, Cupertino, CA (US); Jie Cui, Cupertino, CA (US); Seyed Ali Akbar Fakoorian, San Diego, CA (US); Wei Zeng, Cupertino, CA (US); Yushu Zhang, Beijing (CN); Huaning Niu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,418

(22) PCT Filed: Jul. 28, 2021

(86) PCT No.: PCT/CN2021/108953
§ 371 (c)(1),
(2) Date: Sep. 17, 2021

(87) PCT Pub. No.: WO2023/004630
PCT Pub. Date: Feb. 2, 2023

(65) Prior Publication Data
US 2024/0031096 A1    Jan. 25, 2024

(51) Int. Cl.
*H04L 5/00* (2006.01)
*H04W 72/1273* (2023.01)

(52) U.S. Cl.
CPC .......... *H04L 5/0051* (2013.01); *H04L 5/0035* (2013.01); *H04W 72/1273* (2013.01)

(58) Field of Classification Search
CPC ... H04L 5/0035; H04L 5/0048; H04L 5/0051; H04B 7/0695; H04B 7/022; H04W 52/325; H04W 72/1273
USPC .......................................................... 370/329
See application file for complete search history.

(56) References Cited

U.S. PATENT DOCUMENTS

| | | | |
|---|---|---|---|
| 2019/0174466 A1* | 6/2019 | Zhang | H04L 5/0057 |
| 2019/0281487 A1* | 9/2019 | Liu | H04W 24/10 |
| 2020/0076659 A1 | 3/2020 | Abedini et al. | |
| 2020/0344707 A1 | 10/2020 | Nagaraja et al. | |
| 2021/0176687 A1 | 6/2021 | Ko et al. | |
| 2022/0046458 A1* | 2/2022 | Zhu | H04L 5/0048 |

FOREIGN PATENT DOCUMENTS

WO    WO-2021160137 A1 *    8/2021

OTHER PUBLICATIONS

PCT/CN2021/108953, International Search Report and Written Opinion, Mar. 30, 2022, 9 pages.

* cited by examiner

*Primary Examiner* — Rownak Islam
(74) *Attorney, Agent, or Firm* — Dorsey & Whitney LLP

(57) ABSTRACT

Configuring non-zero-power channel state information reference signal (NZP-CSI-RS) may include encoding a channel state information (CSI) configuration communication for transmission to a user equipment (UE) that is in connected mode with both a first transmission and reception point (TRP) associated with a serving cell and a second TRP associated with a neighbor cell. The NZP-CSI-RS configuration communication may establish a plurality of parameters for NZP-CSI-RS in the serving cell and the neighbor cell.

18 Claims, 5 Drawing Sheets

SOLUTIONS FOR ENHANCEMENT OF INTER-CELL OPERATION FOR MULTI-TRP

TECHNICAL FIELD

This application relates generally to wireless communication systems, including beam management for multi-transmission and reception point (TRP) operation.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Multi-transmission and reception point (TRP) allows a user equipment (UE) to connect with multiple TRPs. Multi-TRP operation was implemented to improve operation of user equipment (UE). For example, multi-TRP operation may improve reliability, coverage, and capacity performance.

As multi-TRP operation requires coordination between the UE and multiple TRPs, configuration is useful to ensure proper operation of the UE and network nodes. In some embodiments, the multiple TRPs may be within a single cell (intracell) and have the same cell ID. In other embodiments, the multiple TRPs may be in neighboring cells (intercell) and have different cell IDs. The different cell IDs may make reference signal configuration even more complicated.

Despite some enhancements associated with multi-TRP being introduced, several issues still remain, as are discussed further throughout this disclosure.

Specifically, embodiments herein may provide enhancement of inter-cell operation for Multi-TRP. Previous efforts to improve multi-TRP have focused on intra-cell configurations. For inter-cell multi-TRP additional configuration may be employed to configure a neighbor cell. Some embodiments describe configuration of non-zero-power channel state information reference signal (NZP-CSI-RS) Resource in a neighbor cell, configuration of NZP-CSI-RS-Resource-Set in the neighbor cell, and configuration of zero-power (ZP)-CSI-RS-Resource(Set) in the neighbor cell.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
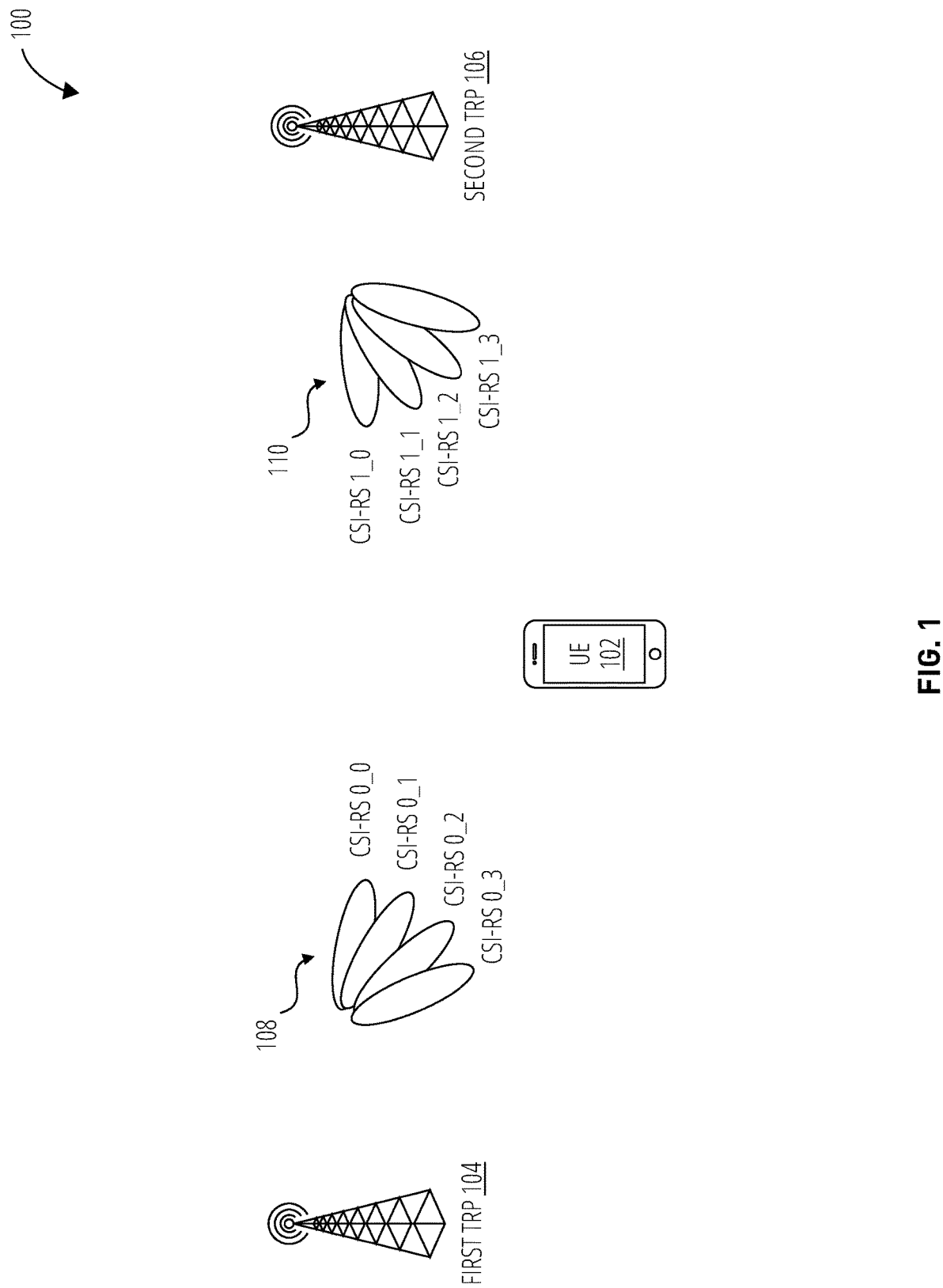
FIG. 1 illustrates a UE performing beam measurement for multi-TRP operation in accordance with one embodiment.

FIG. 1 illustrates a UE 102 performing beam measurement for multi-TRP operation according to some embodiments. As shown, a network 100 may include a first TRP 104 and a second TRP 106. The first TRP 104 and the second TRP 106 may be network nodes (e.g., gNodeB) belonging to a same cell or different cells. For example, the first TRP 104 may be associated with a serving cell and the second TRP 106 may be associated with a neighboring cell. The first TRP 104 and the second TRP 106 are each configured to communicate with a UE 102.

As further shown, each TRP (i.e., the first TRP 104 and the second TRP 106) includes various CSI-RS resources. The first TRP 104 includes a first set of RS resources 108 including CSI-RS 0_0, CSI-RS 0_1, CSI-RS 0_2, and CSI-RS 0_3. The second TRP 106 includes a second set of RS resources 110 including CSI-RS 1_0, CSI-RS 1_1, CSI-RS 1_2, and CSI-RS 1_3. While the illustrated embodiment contains four resources for each TRP, more resources or less resources may be associated with one or both TRPs. The resources may be paired by the network 100. That is each one of the resources from the first set of RS resources 108 may be paired with one of the resources from the second set of RS resources 110.

The CSI-RSs may be NZP-CSI-RSs. An information element (IE) NZP-CSI-RS-Resource may be used to configure an NZP-CSI-RS. In some embodiments, the IE NZP-CSI-RS-Resource may be used to configure NZP-CSI-RS in both the serving cell and the neighboring cell. In some embodiments, the serving cell may provide NZP-CSI-RS-Resource configuration to the UE for both the serving cell and the neighboring cell.

Described herein are principles that may be used to configure NZP-CSI-RSs for both a serving cell and a neighboring cell. For example, FIG. 2 and FIG. 3 illustrate flowcharts of methods for NZP-CSI-RS configuration.

Figure 2:
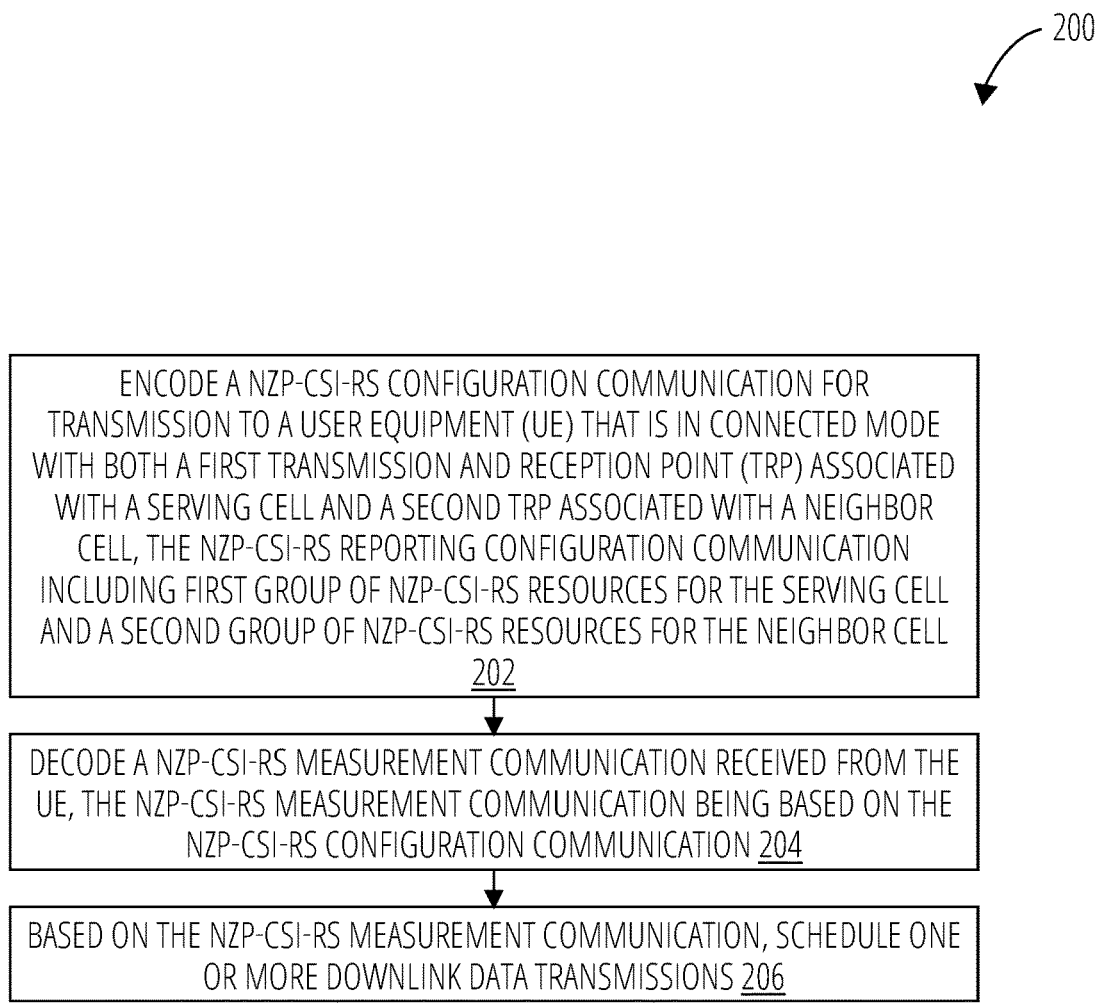
FIG. 2 illustrates a flow chart of a method for a network node to configure NZP-CSI-RS resources in accordance with one embodiment.
Figure 3:
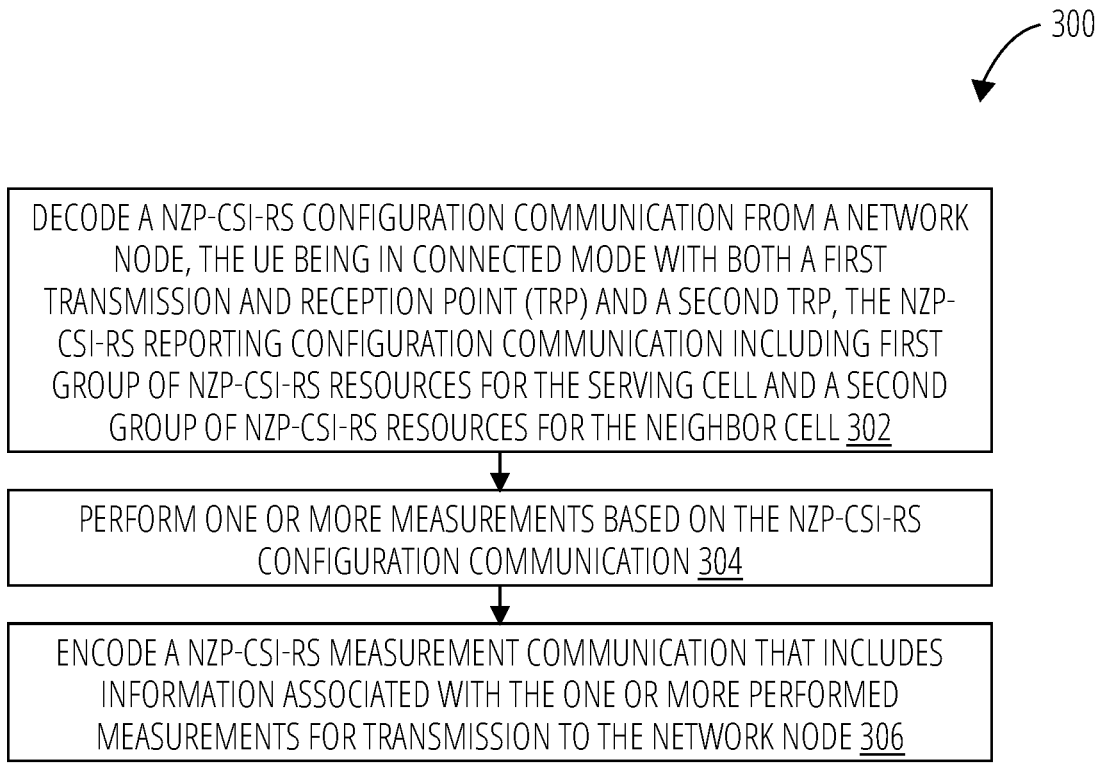
FIG. 3 illustrates a flow chart of a method for a UE to perform beam measurement reporting for multi-TRP operation in accordance with one embodiment.

FIG. 2 illustrates a flow chart of a method 200 for a network node to configure a NZP-CSI-RS. The network node may encode 202 a NZP-CSI-RS configuration communication for transmission to a UE that is in connected mode with both a first TRP associated with a serving cell and a second TRP associated with a neighbor cell. The NZP-CSI-RS reporting configuration communication may include a first group of NZP-CSI-RS resources for the serving cell and a second group of NZP-CSI-RS resources for the neighbor cell.

The network node may use the NZP-CSI-RS configuration communication to configure aspects of the NZP-CSI-RS in the neighbor cell in addition to the serving cell. For example, the following parameters may be configured via the information elements NZP-CSI-RS-Resource and NZP-CSI-RS-ResourceSet while considering both the neighbor cell and the serving cell.

For inter-cell multi-TRP operation, the network node can configure the NZP-CSI-RS in neighbor cell explicitly for one or multiple of the following NZP-CSI-RS use case: NZP-CSI-RS for Tracking Reference Signal (TRS); a NZP-CSI-RS for Beam Management; and a NZP-CSI-RS for other purpose. The network node may configure an NZP-CSI-RS for the neighbor cell as an NZP-CSI-RS for TRS by setting a trs-Info field in a NZP-CSI-RS-ResourceSet information element. The network node may therefore use the trs-Info flag to indicate that a NZP-CSI-RS resources is for tracking in the neighbor cell. In some situations it may not be desirable to use time and frequency tracking in the neighbor cell, in these situations the network may determine to not configure a NZP-CSI-RS for TRS for the neighbor cell and therefore not set the trs-Info flag. To configure a NZP-CSI-RS for Beam Management the network node may set a repetition field in the NZP-CSI-RS-ResourceSet information element. The repetition field being set may indicate to the UE that the NZP-CSI-RS is for Beam Management. The network node may configure the NZP-CSI-RS for other purposes by not setting the trs-Info field and repetition field. The trs-Info field and repetition field not being set may indicate to the UE that the NZP-CSI-RS is configured for other purposes.

The network node may configure an NZP-CSI-RS for the neighbor cell to one or multiple time domain patterns. For example, the network node may configure the NZP-CSI-RS as one or more of a periodic resource type, a semi-persistent resource type, and an aperiodic resource type. The network may limit time domain based on network capability. For example, an aperiodic time domain pattern requires more network capability than the semi-persistent and periodic time domain patterns. To configure the NZP-CSI-RS to a time domain pattern, a resourceType field in an information element may be configured as periodic, semiPersistent, or aperiodic.

The network may also synchronize timing between the neighbor cell and the serving cell. The timing of the neighbor cell may be configured to align with the timing of the serving cell. For example, the timing between the neighbor cell and the serving cell may be aligned at least within a Cyclic Prefix (CP) (i.e., CP aligned). Additionally, the Orthogonal Frequency Division Multiplexing (OFDM) symbol from the neighbor cell and the serving cell is received at the UE side with reception timing difference less than CP. In some embodiments, the timing of the neighbor cell may be configured to be slot aligned. For instance, at the UE receiver side, the slot boundary of the neighbor cell and the serving cell may be aligned such that a reception timing difference is less than CP. In some embodiments, the timing of the neighbor cell may be configured to be System Frame Number (SFN) aligned. For instance, at the UE receiver side, the SFN (Radio Frame) boundary of the neighbor cell and the serving cell may be aligned such that reception timing difference is less than CP.

The network node may also configure a powerControlOffset parameter and powerControlOffsetSS parameter for the neighbor cell using the NZP-CSI-RS configuration communication. The powerControlOffset parameter may be an assumed ratio of Physical Downlink Shared Channel (PDSCH) Energy per resource element (EPRE) to NZP-CSI-RS EPRE when UE derives CSI feedback. The powerControlOffsetSS may be the assumed ratio of NZP-CSI-RS EPRE to SS/PBCH block EPRE. To configure these parameters when considering the neighbor cell and the serving cell, the following solutions may be applied. In some embodiments, the powerControlOffset parameter for the neighbor cell may only be needed when the NZP-CSI-RS is configured for Link Adaption CSI (LA-CSI) (i.e., UE needs to report PMI/RI/LI/CQI). Further, in some embodiments, the network may configure the powerControlOffsetSS parameter for automatic gain control (AGC) and pathloss estimation based on the neighbor cell or the serving cell. For example, in some embodiments the reference power of the powerControlOffsetSS may be the Secondary Synchronization Signals (SSS) transmit power of the serving cell. In other embodiments, the reference power of the powerControlOffsetSS may be the SSS transmit power of the neighbor cell.

In some embodiments, the NZP-CSI-RS configuration communication may further comprise a qcl-InfoPeriodicCSI-RS. For qcl-InfoPeriodicCSI-RS configuration one of the following two options may be employed. In the first option, only the RS in the serving cell may be configured. In the second option, the RS in the serving cell and/or neighbor cell can be configured.

In some embodiments, the NZP-CSI-RS configuration communication may further comprise a periodicityAndOffset parameter. The periodicityAndOffset parameter may define the CSI-RS periodicity and slot offset. In some embodiments, if the serving cell and neighbor cell are symbol, slot, or SFN synchronized, the reference timing may be the timing of the serving cell and no enhancement of the periodicityAndOffset parameter may be needed. Additionally, an additional symbol offset may be configured, if the serving cell and neighbor cell are not symbol synchronized. In some embodiments, if the serving cell and neighbor cell are not symbol, slot, or SFN synchronized, the network node may explicitly configure the reference timing for the neighbor node. For example, information can be configured to assist UE to acquire the neighbor cell timing. In some embodiments, this information may include one or both of a measurement window and the neighbor cell's Physical Cell ID (PCI).

In some embodiments, the NZP-CSI-RS configuration communication may further comprise a CSI-FrequencyOccupation information element. The CSI-FrequencyOccupation information element may be used to configure the frequency domain occupation of a NZP-CSI-RS-Resource. In some embodiments, the following options may be used as a reference signal for the CSI-FrequencyOccupation information element. As a first option, the reference point is the Point A, i.e., common resource block #0, of the serving cell. As a second option, the reference point is the Point A, i.e., common resource block #0, of the neighbor cell.

In some embodiments, the NZP-CSI-RS configuration communication may further comprise a NZP-CSI-RS-ResourceSet. The network node may configure NZP-CSI-RS-ResourceSet for the neighbor cell. In some embodiments, the following options may be used for configuring the NZP-CSI-RS-ResourceSet. In a first option, all NZP-CSI-RS-Resources in the same NZP-CSI-RS-ResourceSet is associated with the same cell. In a second option, the NZP-CSI-RS-Resources in the same NZP-CSI-RS-ResourceSet may be associated with different cells. For example, within the same NZP-CSI-RS-ResourceSet, some NZP-CSI-RS-Resource may be associated with the serving cell, while other NZP-CSI-RS-Resource may be associated with the neighbor cell.

In some embodiments, the NZP-CSI-RS-ResourceSet may comprise an aperiodicTriggeringOffset parameter. The network node may configure the aperiodicTriggeringOffset parameter based on whether the serving cell and neighbor cell are symbol, slot, or SFN synchronized. If serving cell and neighbor cell are symbol, or, slot, or, SFN synchronized, the reference timing may be the timing of the serving cell and no enhancement to the aperiodicTriggeringOffset parameter may be needed. In some embodiment, an additional symbol offset may be configured, if the serving cell and neighbor cell are not symbol synchronized. If the serving cell and neighbor cell are not symbol, slot, or SFN synchronized, the reference timing may be explicitly configured. Additional information can be configured to assist the UE to acquire the neighbor cell timing. For example, the network node may provide one or both of a measurement window, and the neighbor cell's PCI.

In some embodiments, the network node may also configure ZP-CSI-RS-Resource(Set) for the neighbor cell. ZP-CSI-RS was introduced for rate matching purpose. For inter-cell multi-TRP operation, to configure the ZP-CSI-RS in neighbor cell explicitly, the network node may configure the periodicityAndOffset and the CSI-FrequencyOccupation parameters for ZP-CSI-RS. In some embodiments, if the serving cell and neighbor cell are symbol, slot, or SFN synchronized the reference timing may be the timing of the serving cell and no enhancement of the periodicityAndOffset parameter may be needed. Additionally, an additional symbol offset may be configured, if the serving cell and neighbor cell are not symbol synchronized. In some embodiments, if the serving cell and neighbor cell are not symbol, slot, or SFN synchronized, the network node may explicitly configure the reference timing for the neighbor node. For example, information can be configured to assist UE to acquire the neighbor cell timing. In some embodiments, this information may include one or both of a measurement window and the neighbor cell's PCI. In some embodiments, a configuration communication may further comprise a CSI-Frequency Occupation information element. The CSI-FrequencyOccupation information element may be used to configure the frequency domain occupation of a ZP-CSI-RS-Resource. In some embodiments, the following options may be used as a reference signal for the CSI-Frequency-Occupation information element. As a first option, the reference point is the Point A, i.e., common resource block #0, of the serving cell. As a second option, the reference point is the Point A, i.e., common resource block #0, of the neighbor cell.

The method 200 further comprises decoding 204 a NZP-CSI-RS measurement communication received from the UE. The NZP-CSI-RS measurement communication being based on the NZP-CSI-RS configuration communication. The method 200 further comprises scheduling 206 one or more downlink data transmissions based on the NZP-CSI-RS measurement communication.

FIG. 3 illustrates a flow chart of a method 300 for a UE to perform beam measurement reporting for multi-TRP operation. The UE may decode 302 a NZP-CSI-RS configuration communication from a network node. The UE may be in connected mode with both a first TRP associated with a first cell and a second TRP associated with a second cell. As discussed with reference to FIG. 2, the NZP-CSI-RS configuration communication may include first group of NZP-CSI-RS resources for the serving cell and a second group of NZP-CSI-RS resources for the neighbor cell.

The UE may use the NZP-CSI-RS configuration communication to determine aspects of the NZP-CSI-RS in the neighbor cell in addition to the serving cell. For example, the following parameters may be decoded from the information elements NZP-CSI-RS-Resource and NZP-CSI-RS-ResourceSet to determine configurations for both the neighbor cell and the serving cell.

The UE may decode the NZP-CSI-RS configuration communication to determine if the NZP-CSI-RS in neighbor cell is configured for one or multiple of the following NZP-CSI-RS use case: NZP-CSI-RS for TRS; a NZP-CSI-RS for Beam Management; and a NZP-CSI-RS for other purpose. The UE may determine that a NZP-CSI-RS for the neighbor cell is configured as an NZP-CSI-RS for TRS when a trs-Info field in a NZP-CSI-RS-ResourceSet information element is set. The UE may determine that a NZP-CSI-RS for the neighbor cell is configured for Beam Management when a repetition field in the NZP-CSI-RS-ResourceSet information element is set. The repetition field being set may indicate to the UE that the NZP-CSI-RS is for Beam Management. The UE may determine that a NZP-CSI-RS for the neighbor cell is configured for other purposes when the trs-Info field and repetition field are not set.

The UE may also use the NZP-CSI-RS configuration communication to determine a time domain patterns. For example, the network node may configure the NZP-CSI-RS as one or more of a periodic resource type, a semi-persistent resource type, and an aperiodic resource type. To determine the NZP-CSI-RS time domain pattern, a resourceType field in an information element may be decoded and determined as being set to periodic, semiPersistent, or aperiodic.

The UE may assume timing configuration between the neighbor cell and the serving cell. In some embodiments, the UE may assume that the neighbor cell and the serving cell are CP aligned, slot aligned, or SFN aligned.

The UE may also decode the may also NZP-CSI-RS configuration communication to determine a powerControlOffset parameter and powerControlOffsetSS parameter for the neighbor cell. In some embodiments, the powerControlOffset parameter for the neighbor cell may only be needed when the NZP-CSI-RS is configured for Link Adaption CSI (LA-CSI) (i.e., UE needs to report PMI/RI/LI/CQI). Further, for in some embodiments, the network may configure the powerControlOffsetSS parameter for automatic gain control (AGC) and pathloss estimation based on the neighbor cell or the serving cell. For example, in some embodiments the reference power of the powerControlOffsetSS may be the Secondary Synchronization Signals (SSS) transmit power of the serving cell. In other embodiments, the reference power of the powerControlOffsetSS may be the SSS transmit power of the neighbor cell.

In some embodiments, the NZP-CSI-RS configuration communication may further comprise a qcl-InfoPeriodicCSI-RS. For qcl-InfoPeriodicCSI-RS configuration one of the following two options may be employed. In the first option, only the RS in the serving cell may be configured. In the second option, the RS in the serving cell and/or neighbor cell can be configured.

In some embodiments, the NZP-CSI-RS configuration communication may further comprise a periodicityAndOffset parameter. The periodicityAndOffset parameter may define the CSI-RS periodicity and slot offset. In some embodiments, if the serving cell and neighbor cell are symbol, slot, or SFN synchronized the reference timing may be the timing of the serving cell and no enhancement of the periodicityAndOffset parameter may be needed. Additionally, an additional symbol offset may be configured, if the serving cell and neighbor cell are not symbol synchronized. In some embodiments, if the serving cell and neighbor cell are not symbol, slot, or SFN synchronized, the network node may explicitly configure the reference timing for the neighbor node. For example, information can be configured to assist UE to acquire the neighbor cell timing. In some embodiments, this information may include one or both of a measurement window and the neighbor cell's Physical Cell ID (PCI).

In some embodiments, the NZP-CSI-RS configuration communication may further comprise a CSI-FrequencyOccupation information element. The CSI-FrequencyOccupation information element may be used to configure the frequency domain occupation of a NZP-CSI-RS-Resource. In some embodiments, the following options may be used as a reference signal for the CSI-FrequencyOccupation information element. As a first option, the reference point is the Point A, i.e., common resource block #0, of the serving cell. As a second option, the reference point is the Point A, i.e., common resource block #0, of the neighbor cell.

In some embodiments, the NZP-CSI-RS configuration communication may further comprise a NZP-CSI-RS-ResourceSet. In some embodiments, the UE can assume that all NZP-CSI-RS-Resource in the same NZP-CSI-RS-ResourceSet is associated with the same cell. In some embodiments, the UE cannot assume that all NZP-CSI-RS-Resource in the same NZP-CSI-RS-ResourceSet is associated with the same cell. For example, within the same NZP-CSI-RS-ResourceSet, some NZP-CSI-RS-Resource may be associated with the serving cell, while other NZP-CSI-RS-Resource may be associated with the neighbor cell.

In some embodiments, the NZP-CSI-RS-ResourceSet may comprise an aperiodicTriggeringOffset parameter. If serving cell and neighbor cell are symbol, or, slot, or, SFN synchronized, the reference timing may be the timing of the serving cell and no enhancement to the aperiodicTriggeringOffset parameter may be needed. In some embodiment, an additional symbol offset may be configured, if the serving cell and neighbor cell are not symbol synchronized. If the serving cell and neighbor cell are not symbol, slot, or SFN synchronized, the reference timing may be explicitly configured. Additional information can be configured to assist the UE to acquire the neighbor cell timing. For example, the network node may provide one or both of a measurement window, and the neighbor cell's PCI.

In some embodiments, the UE may also receive a ZP-CSI-RS-Resource(Set) for the neighbor cell. For inter-cell multi-TRP operation, to configure the ZP-CSI-RS in neighbor cell explicitly, the network node may configure the periodicityAndOffset and the CSI-FrequencyOccupation parameters for ZP-CSI-RS. In some embodiments, if the serving cell and neighbor cell are symbol, slot, or SFN synchronized the reference timing may be the timing of the serving cell and no enhancement of the periodicityAndOffset parameter may be needed. Additionally, an additional symbol offset may be configured, if the serving cell and neighbor cell are not symbol synchronized. In some embodiments, if the serving cell and neighbor cell are not symbol, slot, or SFN synchronized, the network node may explicitly configure the reference timing for the neighbor node. For example, information can be configured to assist UE to acquire the neighbor cell timing. In some embodiments, this information may include one or both of a measurement window and the neighbor cell's PCI. In some embodiments, a ZP-CSI-RS configuration communication may further comprise a CSI-FrequencyOccupation information element. The CSI-FrequencyOccupation information element may be used to configure the frequency domain occupation of a ZP-CSI-RS-Resource. In some embodiments, the following options may be used as a reference signal for the CSI-FrequencyOccupation information element. As a first option, the reference point is the Point A, i.e., common resource block #0, of the serving cell. As a second option, the reference point is the Point A, i.e., common resource block #0, of the neighbor cell.

In the method 300 further comprises performing 304 one or more measurements based on the NZP-CSI-RS configuration communication, and encoding 306 a NZP-CSI-RS measurement communication that includes information associated with the one or more performed measurements for transmission to the network node.

Figure 4:
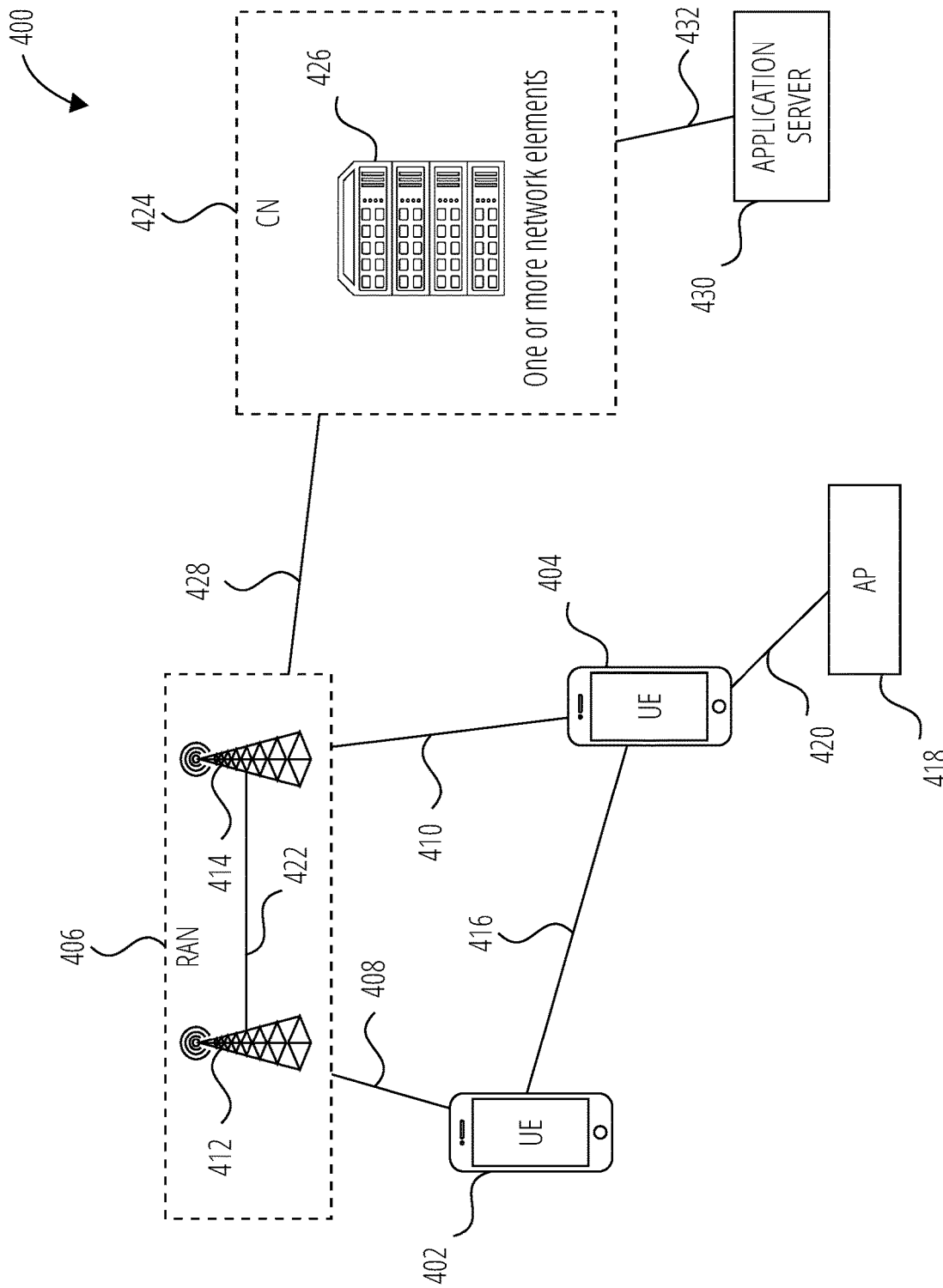
FIG. 4 illustrates an example architecture of a wireless communication system, according to embodiments disclosed herein.

FIG. 4 illustrates an example architecture of a wireless communication system 400, according to embodiments disclosed herein. The following description is provided for an example wireless communication system 400 that operates in conjunction with the LTE system standards and/or 5G or NR system standards as provided by 3GPP technical specifications.

As shown by FIG. 4, the wireless communication system 400 includes UE 402 and UE 404 (although any number of UEs may be used). In this example, the UE 402 and the UE 404 are illustrated as smartphones (e.g., handheld touch-screen mobile computing devices connectable to one or more cellular networks), but may also comprise any mobile or non-mobile computing device configured for wireless communication.

The UE 402 and UE 404 may be configured to communicatively couple with a RAN 406. In embodiments, the RAN 406 may be NG-RAN, E-UTRAN, etc. The UE 402 and UE 404 utilize connections (or channels) (shown as connection 408 and connection 410, respectively) with the RAN 406, each of which comprises a physical communications interface. The RAN 406 can include one or more base stations, such as base station 412 and base station 414, that enable the connection 408 and connection 410.

In this example, the connection 408 and connection 410 are air interfaces to enable such communicative coupling, and may be consistent with RAT(s) used by the RAN 406, such as, for example, an LTE and/or NR.

In some embodiments, the UE 402 and UE 404 may also directly exchange communication data via a sidelink interface 416. The UE 404 is shown to be configured to access an access point (shown as AP 418) via connection 420. By way of example, the connection 420 can comprise a local wireless connection, such as a connection consistent with any IEEE 202.11 protocol, wherein the AP 418 may comprise a Wi-Fi® router. In this example, the AP 418 may be connected to another network (for example, the Internet) without going through a CN 424.

In embodiments, the UE 402 and UE 404 can be configured to communicate using orthogonal frequency division multiplexing (OFDM) communication signals with each other or with the base station 412 and/or the base station 414 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 412 or base station 414 may be implemented as one or more software entities running on server computers as part of a virtual network. In addition, or in other embodiments, the base station 412 or base station 414 may be configured to communicate with one another via interface 422. In embodiments where the wireless communication system 400 is an LTE system (e.g., when the CN 424 is an EPC), the interface 422 may be an X2 interface. The X2 interface may be defined between two or more base stations (e.g., two or more eNBs and the like) that connect to an EPC, and/or between two eNBs connecting to the EPC. In embodiments where the wireless communication system 400 is an NR system (e.g., when CN 424 is a 5GC), the interface 422 may be an Xn interface. The Xn interface is defined between two or more base stations (e.g., two or more gNBs and the like) that connect to 5GC, between a base station 412 (e.g., a gNB) connecting to 5GC and an eNB, and/or between two eNBs connecting to 5GC (e.g., CN 424).

The RAN 406 is shown to be communicatively coupled to the CN 424. The CN 424 may comprise one or more network elements 426, which are configured to offer various data and telecommunications services to customers/subscribers (e.g., users of UE 402 and UE 404) who are connected to the CN 424 via the RAN 406. The components of the CN 424 may be implemented in one physical device or separate physical devices including components to read and execute instructions from a machine-readable or computer-readable medium (e.g., a non-transitory machine-readable storage medium).

In embodiments, the CN 424 may be an EPC, and the RAN 406 may be connected with the CN 424 via an S1 interface 428. In embodiments, the S1 interface 428 may be split into two parts, an S1 user plane (S1-U) interface, which carries traffic data between the base station 412 or base station 414 and a serving gateway (S-GW), and the S1-MME interface, which is a signaling interface between the base station 412 or base station 414 and mobility management entities (MMEs).

In embodiments, the CN 424 may be a 5GC, and the RAN 406 may be connected with the CN 424 via an NG interface 428. In embodiments, the NG interface 428 may be split into two parts, an NG user plane (NG-U) interface, which carries traffic data between the base station 412 or base station 414 and a user plane function (UPF), and the S1 control plane (NG-C) interface, which is a signaling interface between the base station 412 or base station 414 and access and mobility management functions (AMFs).

Generally, an application server 430 may be an element offering applications that use internet protocol (IP) bearer resources with the CN 424 (e.g., packet switched data services). The application server 430 can also be configured to support one or more communication services (e.g., VoIP sessions, group communication sessions, etc.) for the UE 402 and UE 404 via the CN 424. The application server 430 may communicate with the CN 424 through an IP communications interface 432.

Figure 5:
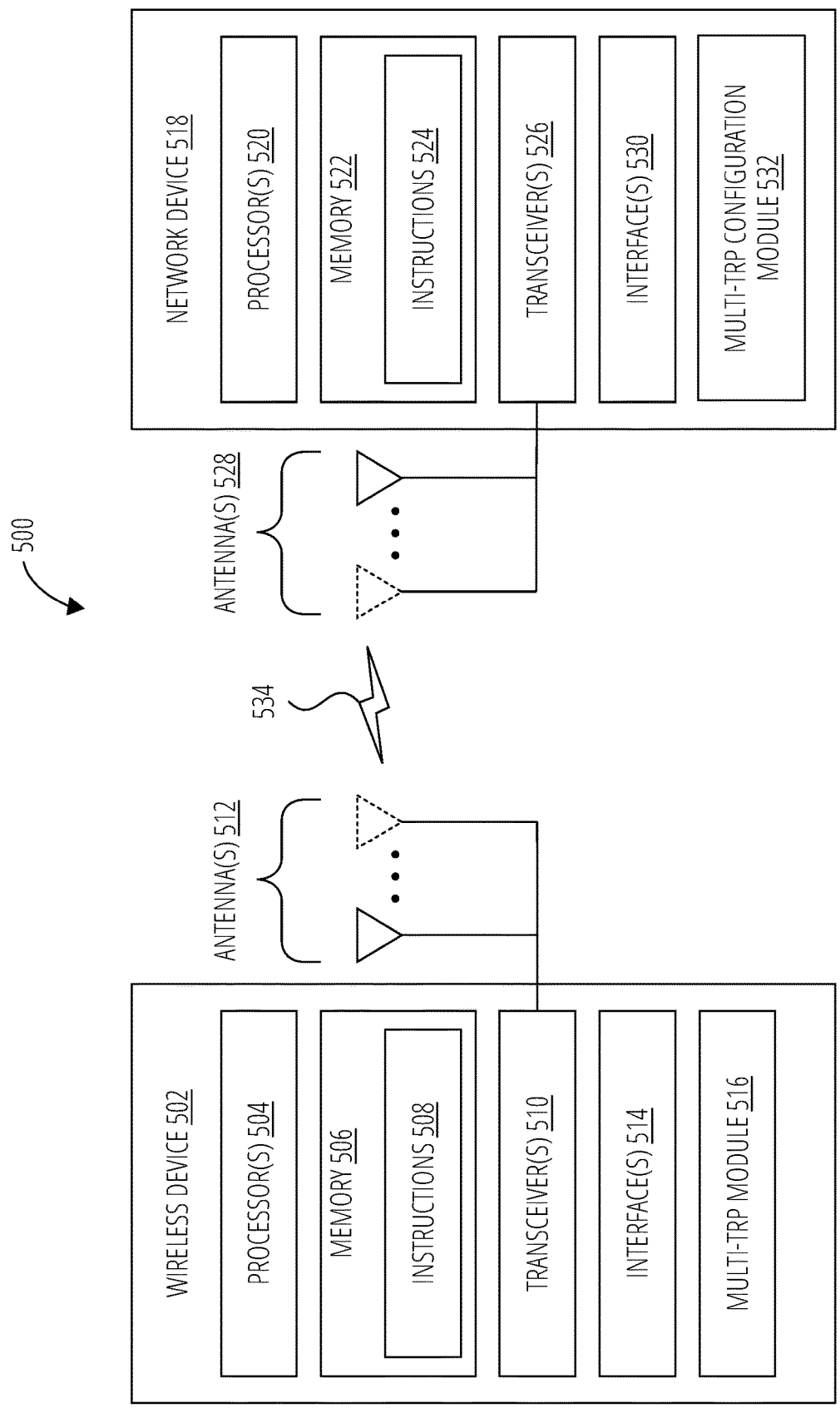
FIG. 5 illustrates a system for performing signaling between a wireless device and a network device, according to embodiments disclosed herein.

FIG. 5 illustrates a system 500 for performing signaling 534 between a wireless device 502 and a network device 518, according to embodiments disclosed herein. The system 500 may be a portion of a wireless communications system as herein described. The wireless device 502 may be, for example, a UE of a wireless communication system. The network device 518 may be, for example, a base station (e.g., an eNB or a gNB) of a wireless communication system.

The wireless device 502 may include one or more processor(s) 504. The processor(s) 504 may execute instructions such that various operations of the wireless device 502 are performed, as described herein. The processor(s) 504 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 502 may include a memory 506. The memory 506 may be a non-transitory computer-readable storage medium that stores instructions 508 (which may include, for example, the instructions being executed by the processor(s) 504). The instructions 508 may also be referred to as program code or a computer program. The memory 506 may also store data used by, and results computed by, the processor(s) 504.

The wireless device 502 may include one or more transceiver(s) 510 that may include radio frequency (RF) transmitter and/or receiver circuitry that use the antenna(s) 512 of the wireless device 502 to facilitate signaling (e.g., the signaling 534) to and/or from the wireless device 502 with other devices (e.g., the network device 518) according to corresponding RATs.

The wireless device 502 may include one or more antenna(s) 512 (e.g., one, two, four, or more). For embodiments with multiple antenna(s) 512, the wireless device 502 may leverage the spatial diversity of such multiple antenna(s) 512 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 502 may be accomplished according to precoding (or digital beamforming) that is applied at the wireless device 502 that multiplexes the data streams across the antenna(s) 512 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 502 may implement analog beamforming techniques, whereby phases of the signals sent by the antenna(s) 512 are relatively adjusted such that the (joint) transmission of the antenna(s) 512 can be directed (this is sometimes referred to as beam steering).

The wireless device 502 may include one or more interface(s) 514. The interface(s) 514 may be used to provide input to or output from the wireless device 502. For example, a wireless device 502 that is a UE may include interface(s) 514 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 510/antenna(s) 512 already described) that allow for communication between the UE and other devices and may operate according to known protocols (e.g., Wi-Fi®, Bluetooth®, and the like).

The wireless device 502 may include a multi-TRP module 516. The multi-TRP module 516 may be implemented via hardware, software, or combinations thereof. For example, the multi-TRP module 516 may be implemented as a processor, circuit, and/or instructions 508 stored in the memory 506 and executed by the processor(s) 504. In some examples, the multi-TRP module 516 may be integrated within the processor(s) 504 and/or the transceiver(s) 510. For example, the multi-TRP module 516 may be implemented by a combination of software components (e.g., executed by a DSP or a general processor) and hardware components (e.g., logic gates and circuitry) within the processor(s) 504 or the transceiver(s) 510.

The multi-TRP module 516 may be used for various aspects of the present disclosure, for example, aspects of FIGS. 1, 2, 4, and 5. The multi-TRP module 516 is configured to perform beam measurements according to the network communication.

The network device 518 may include one or more processor(s) 520. The processor(s) 520 may execute instructions such that various operations of the network device 518 are performed, as described herein. The processor(s) 504 may include one or more baseband processors implemented using, for example, a CPU, a DSP, an ASIC, a controller, an FPGA device, another hardware device, a firmware device, or any combination thereof configured to perform the operations described herein.

The network device 518 may include a memory 522. The memory 522 may be a non-transitory computer-readable storage medium that stores instructions 524 (which may include, for example, the instructions being executed by the processor(s) 520). The instructions 524 may also be referred to as program code or a computer program. The memory 522 may also store data used by, and results computed by, the processor(s) 520.

The network device 518 may include one or more transceiver(s) 526 that may include RF transmitter and/or receiver circuitry that use the antenna(s) 528 of the network device 518 to facilitate signaling (e.g., the signaling 534) to and/or from the network device 518 with other devices (e.g., the wireless device 502) according to corresponding RATs.

The network device 518 may include one or more antenna(s) 528 (e.g., one, two, four, or more). In embodiments having multiple antenna(s) 528, the network device 518 may perform MIMO, digital beamforming, analog beamforming, beam steering, etc., as has been described.

The network device 518 may include one or more interface(s) 530. The interface(s) 530 may be used to provide input to or output from the network device 518. For example, a network device 518 that is a base station may include interface(s) 530 made up of transmitters, receivers, and other circuitry (e.g., other than the transceiver(s) 526/antenna(s) 528 already described) that enables the base station to communicate with other equipment in a core network, and/or that enables the base station to communicate with external networks, computers, databases, and the like for purposes of operations, administration, and maintenance of the base station or other equipment operably connected thereto.

The network device 518 may include a multi-TRP configuration module 532. The multi-TRP configuration module 532 may be implemented via hardware, software, or combinations thereof. For example, the multi-TRP configuration module 532 may be implemented as a processor, circuit, and/or instructions 524 stored in the memory 522 and executed by the processor(s) 520. In some examples, the multi-TRP configuration module 532 may be integrated within the processor(s) 520 and/or the transceiver(s) 526. For example, the multi-TRP configuration module 532 may be implemented by a combination of software components (e.g., executed by a DSP or a general processor) and hardware components (e.g., logic gates and circuitry) within the processor(s) 520 or the transceiver(s) 526.

The multi-TRP configuration module 532 may be used for various aspects of the present disclosure, for example, aspects of FIGS. 1-3. The multi-TRP configuration module 532 is configured to generate a NZP-CSI configuration communication.

Embodiments contemplated herein include an apparatus comprising means to perform one or more elements of the method 300. This apparatus may be, for example, an apparatus of a UE (such as a wireless device 502 that is a UE, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a UE (such as a memory 506 of a wireless device 502 that is a UE, as described herein).

Embodiments contemplated herein include an apparatus comprising logic, modules, or circuitry to perform one or more elements of the method 300. This apparatus may be, for example, an apparatus of a UE (such as a wireless device 502 that is a UE, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a UE (such as a wireless device 502 that is a UE, as described herein). Embodiments contemplated herein include a signal as described in or related to one or more elements of the method 200 and method 300.

Embodiments contemplated herein include a signal as described in or related to one or more elements of the method 200 and method 300.

Embodiments contemplated herein include a computer program or computer program product comprising instructions, wherein execution of the program by a processor is to cause the processor to carry out one or more elements of the method 300. The processor may be a processor of a UE (such as a processor(s) 504 of a wireless device 502 that is a UE, as described herein). These instructions may be, for example, located in the processor and/or on a memory of the UE (such as a memory 506 of a wireless device 502 that is a UE, as described herein).

Embodiments contemplated herein include an apparatus comprising means to perform one or more elements of the method 200. This apparatus may be, for example, an apparatus of a base station (such as a network device 518 that is a base station, as described herein).

Embodiments contemplated herein include one or more non-transitory computer-readable media comprising instructions to cause an electronic device, upon execution of the instructions by one or more processors of the electronic device, to perform one or more elements of the method 200. This non-transitory computer-readable media may be, for example, a memory of a base station (such as a memory 522 of a network device 518 that is a base station, as described herein).

Embodiments contemplated herein include an apparatus comprising logic, modules, or circuitry to perform one or more elements of the method 200. This apparatus may be, for example, an apparatus of a base station (such as a network device 518 that is a base station, as described herein).

Embodiments contemplated herein include an apparatus comprising: one or more processors and one or more computer-readable media comprising instructions that, when executed by the one or more processors, cause the one or more processors to perform one or more elements of the method 200. This apparatus may be, for example, an apparatus of a base station (such as a network device 518 that is a base station, as described herein).

Embodiments contemplated herein include a signal as described in or related to one or more elements of the method 200.

Embodiments contemplated herein include a computer program or computer program product comprising instructions, wherein execution of the program by a processing element is to cause the processing element to carry out one or more elements of the method 200. The processor may be a processor of a base station (such as a processor(s) 520 of a network device 518 that is a base station, as described herein). These instructions may be, for example, located in the processor and/or on a memory of the UE (such as a memory 522 of a network device 518 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a network node, comprising:
 encoding a non-zero-power channel state information reference signal (NZP-CSI-RS) configuration communication for transmission to a user equipment (UE) that is in connected mode with both a first transmission and reception point (TRP) associated with a serving cell and a second TRP associated with a neighbor cell, the NZP-CSI-RS configuration communication including a first group of NZP-CSI-RS resources for the serving cell and a second group of NZP-CSI-RS resources for the neighbor cell,
 wherein the second group of NZP-CSI-RS resources for the neighbor cell comprises a powerControlOffset element for the neighbor cell, wherein the powerControlOffset element is used when a NZP-CSI-RS is configured for Link Adaption CSI, and
 wherein the second group of NZP-CSI-RS resources for the neighbor cell comprises a powerControlOffsetSS element and wherein a reference power of powerControlOffsetSS element is a Secondary Synchronization Signals (SSS) transmit power of the serving cell or a SSS transmit power of the neighbor cell;

decoding a NZP-CSI-RS measurement communication received from the UE, the NZP-CSI-RS measurement communication being based on the NZP-CSI-RS configuration communication; and based on the NZP-CSI-RS measurement communication, scheduling one or more downlink data transmissions.

2. The method of claim 1, wherein the second group of NZP-CSI-RS resources for the neighbor cell comprises one or more of a first NZP-CSI-RS for TRS, a second NZP-CSI-RS for Beam Management, and a third NZP-CSI-RS for other purpose.

3. The method of claim 1, wherein the second group of NZP-CSI-RS resources for the neighbor cell are configured as a periodic resource type, a semi-persistent resource type, or an aperiodic resource type.

4. The method of claim 1, wherein timing between the neighbor cell and the serving cell are Cyclic Prefix (CP) aligned, slot aligned, or System Frame Number (SFN) aligned.

5. The method of claim 1, wherein the NZP-CSI-RS configuration communication further comprises a qcl-Info-PeriodicCSI-RS, and wherein a reference signal in the serving cell and the neighbor cell is configured.

6. The method of claim 1, further comprising configuring a reference timing, wherein when timing between the neighbor cell and the serving cell are CP aligned, slot aligned, or SFN aligned, the reference timing is timing of the serving cell, and when timing between the neighbor cell and the serving cell are not CP aligned, slot aligned, or SFN aligned, the method further comprising explicitly configuring the reference timing; and configuring a reference point for CSI-FrequencyOccupation, wherein the reference point is based on a resource block of the serving cell or the neighbor cell.

7. The method of claim 1, wherein the NZP-CSI-RS configuration communication comprises two NZP-CSI-RS-ResourceSets, wherein a first NZP-CSI-RS-ResourceSet comprises the first group of NZP-CSI-RS resources for the serving cell and a second NZP-CSI-RS-ResourceSet comprises the second group of NZP-CSI-RS resources for the neighbor cell.

8. The method of claim 1, wherein the NZP-CSI-RS configuration communication comprises a NZP-CSI-RS-ResourceSet with some NZP-CSI-RS resources associated with the serving cell and other NZP-CSI-RS resources associated with the neighbor cell.

9. The method of claim 1, further comprising encoding a ZP-CSI-RS configuration communication to configure ZP-CSI-RS in the neighbor cell, configuring a reference timing for the ZP-CSI-RS, wherein when timing between the neighbor cell and the serving cell are CP aligned, slot aligned, or SFN aligned, the reference timing is timing of the serving cell, and when timing between the neighbor cell and the serving cell are not CP aligned, slot aligned, or SFN aligned, the method further comprising explicitly configuring the reference timing; and configuring a reference point for CSI-FrequencyOccupation for the ZP-CSI-RS, wherein the reference point is based on a resource block of the serving cell or the neighbor cell.

10. A method for a user equipment (UE), comprising:

decoding a NZP-CSI-RS configuration communication from a network node, the UE being in connected mode with both a first transmission and reception point (TRP) associated with a serving cell and a second TRP associated with a neighbor cell, the NZP-CSI-RS configuration communication including a first group of NZP-CSI-RS resources for the serving cell and a second group of NZP-CSI-RS resources for the neighbor cell, wherein the second group of NZP-CSI-RS resources for the neighbor cell comprises a powerControlOffset element for the neighbor cell, wherein the powerControlOffset element is used when a NZP-CSI-RS is configured for Link Adaption CSI, and wherein the second group of NZP-CSI-RS resources for the neighbor cell comprises a powerControlOffsetSS element and wherein a reference power of powerControlOffsetSS element is a Secondary Synchronization Signals (SSS) transmit power of the serving cell or a SSS transmit power of the neighbor cell;

performing one or more measurements based on the NZP-CSI-RS configuration communication; and encoding a NZP-CSI-RS measurement communication that includes information associated with the one or more performed measurements for transmission to the network node.

11. The method of claim 10, wherein the second group of NZP-CSI-RS resources for the neighbor cell comprises one or more of a first NZP-CSI-RS for TRS, a second NZP-CSI-RS for Beam Management, and a third NZP-CSI-RS for other purpose.

12. The method of claim 10, wherein the second group of NZP-CSI-RS resources for the neighbor cell are configured as a periodic resource type, a semi-persistent resource type, or an aperiodic resource type.

13. The method of claim 10, wherein timing between the neighbor cell and the serving cell are CP aligned, slot aligned, or SFN aligned.

14. The method of claim 10, wherein the NZP-CSI-RS configuration communication further comprises a qcl-Info-PeriodicCSI-RS, and wherein a reference signal in the serving cell and the neighbor cell is configured.

15. The method of claim 10, further comprising:

determining a reference timing, wherein when timing between the neighbor cell and the serving cell are CP aligned, slot aligned, or SFN aligned, the reference timing is timing of the serving cell, and when timing between the neighbor cell and the serving cell are not CP aligned, slot aligned, or SFN aligned, the NZP-CSI-RS configuration communication explicitly configures the reference timing; and decoding a reference point from a CSI-FrequencyOccupation of the NZP-CSI-RS configuration communication, wherein the reference point is based on a resource block of the serving cell or the neighbor cell.

16. The method of claim 10, wherein the NZP-CSI-RS configuration communication comprises two NZP-CSI-RS-ResourceSets, wherein a first NZP-CSI-RS-ResourceSet comprises the first group of NZP-CSI-RS resources for the serving cell and a second NZP-CSI-RS-ResourceSet comprises the second group of NZP-CSI-RS resources for the neighbor cell.

17. The method of claim 10, wherein the NZP-CSI-RS configuration communication comprises a NZP-CSI-RS-ResourceSet with some NZP-CSI-RS resources associated with the serving cell and other NZP-CSI-RS resources associated with the neighbor cell.

18. The method of claim 10, further comprising decoding a ZP-CSI-RS configuration communication to determine ZP-CSI-RS in the neighbor cell,
- determining a reference timing for the ZP-CSI-RS, wherein when timing between the neighbor cell and the serving cell are CP aligned, slot aligned, or SFN aligned, the reference timing is timing of the serving cell, and when timing between the neighbor cell and the serving cell are not CP aligned, slot aligned, or SFN aligned, the ZP-CSI-RS configuration communication explicitly configuring the reference timing; and
- decoding a reference point for CSI-FrequencyOccupation for the ZP-CSI-RS from the ZP-CSI-RS configuration communication, wherein the reference point is based on a resource block of the serving cell or the neighbor cell.

* * * * *